United States Patent
Enzinna

(12) United States Patent  (10) Patent No.: US 6,642,636 B2
(45) Date of Patent: Nov. 4, 2003

(54) STEPPER MOTOR DRIVING ASSEMBLY WITH POSITIVE BRAKE

(75) Inventor: Donald John Enzinna, Lockport, NY (US)

(73) Assignee: Delphi Technologies, Inc., Troy, MI (US)

(*) Notice: Subject to any disclaimer, the term of this patent is extended or adjusted under 35 U.S.C. 154(b) by 129 days.

(21) Appl. No.: 10/114,216

(22) Filed: Apr. 2, 2002

(65) Prior Publication Data

US 2003/0184177 A1 Oct. 2, 2003

(51) Int. Cl.$^7$ .............................................. H02K 49/00
(52) U.S. Cl. .................... 310/93; 310/77; 310/49 R; 310/94; 188/171; 188/162
(58) Field of Search ............................. 310/94, 93, 92, 310/77, 76, 99, 120, 188, 123, 49 R; 188/171, 166, 162, 161; 318/372

(56) References Cited

U.S. PATENT DOCUMENTS

| | | | |
|---|---|---|---|
| 3,555,321 A | * 1/1971 | Gruener ...................... 310/93 |
| 4,130,188 A | * 12/1978 | Askew ........................ 188/170 |
| 4,910,423 A | 3/1990 | Werber ........................ 310/188 |
| 5,306,989 A | 4/1994 | Feller, Jr. ..................... 318/372 |
| 5,406,180 A | * 4/1995 | Feller, Jr. ..................... 318/372 |
| 5,821,712 A | * 10/1998 | Fittje ........................... 318/376 |
| 5,932,944 A | * 8/1999 | Ko ............................... 310/77 |

* cited by examiner

*Primary Examiner*—Thanh Lam
(74) *Attorney, Agent, or Firm*—Patrick M. Griffin

(57) ABSTRACT

An automatically acting braking system for a stepper motor (10) of the type having a rotor (18) that is radially centered within a stationary stator (12) and which rotates about the central axis of a central shaft (30). The rotor (18) is allowed to axially slide back and forth, biased in one direction continually by a resilient means (40). When the stator (12) is energized, it pulls the rotor (18) to an axially centered position within stator (12), but when it is de energized, the resilient means (40) pushes the rotor (18) to one side, lockingly engaging its teeth (24) with the teeth (44) of a fixed locking ring (42).

4 Claims, 2 Drawing Sheets

STEPPER MOTOR DRIVING ASSEMBLY WITH POSITIVE BRAKE

TECHNICAL FIELD

This invention relates to stepper motor drive assemblies in general, and specifically to a positively locking brake for such an assembly.

BACKGROUND OF THE INVENTION

The air flow control valves used automotive air conditioning and ventilation systems have conventionally been swinging door type valves, turned back and forth over less than a full turn by a conventional electric motors. A conventional electric motor has an inherent resistance to being back driven. Furthermore, to step down the speed and elevate the effective torque of these motors, reduction gears are typically used, which are inherently difficult to back drive. The combination of motor and reduction gear resistances generally provide sufficient holding force to keep the valves in place at any given position, when the motor is turned off.

Swinging door type valves are, in some applications, being replaced by so called film valves, in which a roll of flexible film with vent openings is rolled back and forth between rollers, somewhat like a window shade with a roller at both the top and bottom. Typically, one roller will be powered and turned, while the other is spring loaded to take up, or wind out, the film roll, maintaining the belt in tension. Instead of conventional motors, stepper motors may be used to advance and wind up a film valve, since they provide the potential for precise control of the film position. An electric stepper motor comprises a primary member and a secondary member which move relative to each other. The primary member, usually the stator, is wound with a plurality of regularly angularly spaced drive coils having central iron cores which energized by drive pulses in some switched sequence. The secondary member, usually the rotor, is axially and radially centered within the stator, supported for rotation by suitable bearings. Typically, the rotor consists of two toothed discs of magnetic material separated by a permanent magnet between them. As the drive pulses are switched to different drive coils, the teeth on the rotor discs move to maintain alignment with the magnetic axes of those coils which are energized and thus relative rotation between the primary and secondary members takes place in a precise manner. When the stator drive coils are de energized, the rotor's magnetic poles still tend to take on a stable, pre determined angular position within the stator, with the teeth of the rotor aligned with the stator coils. This stable position, while predictable, is not a strongly maintained, and does not strongly resist turning of the rotor.

While it is precisely controllable, and efficient, a stepper motor generally is slower than a conventional electric motor by a factor of ten, and proportionately easier to back drive. Film valves must move through multiple turns to be effective, unlike flapper door valves, and any reduction gears used to step down the already lower motor speed will have a much lower step down ratio. The net effect, then, with a stepper motor and its reduction gears is a far smaller inherent resistance to back driving when the motor is de energized, lower by as much as a factor of 100. The film valve tension spring can even potentially over power the stepper motor assembly when it is turned off, and pull the film valve out of its desired position. Therefore, some other means of holding the film valve in position when the motor is de energized may be needed.

SUMMARY OF THE INVENTION

The subject invention provides a means of positively holding or braking a stepper motor rotor relative to the stator, automatically, when the motor is de energized, and releasing it automatically when the motor is re energized. Any mechanism driven by the stepper motor is therefore also braked and held when the motor is de energized.

In the preferred embodiment disclosed, a stepper motor has a conventional stator, but the rotor is co axially supported within the stator by a central shaft by bearings that allow the rotor to shift to one side, out of axial alignment with the stator. A constantly acting resilient means, such as a spring, tends to push the rotor in one axial direction, out of its axial centered position within the stator. When the stator is energized, however, its electro magnetic force is sufficient to overcome the mechanical resilient force, and pull and keep the rotor axially centered within the stator. The resilient means can therefore actually shift the rotor to the side only when the stator is de energized. A toothed locking ring of non magnetic material is provided, fixed relative to the stator, that registers with the teeth of the rotor so as to lockingly engage with them when the rotor shifts to the side at the time of stator de energization. This is possible because of the pre determined, stable angular position that the rotor teeth take on relative to the stator (and locking ring) when the stator is de energized. The rotor is thereby positively locked and prevented from turning, and any load or mechanism driven by the motor is thereby held stationary, as well. When the stator is re energized, the pulling of the rotor back to center within the stator disengages and frees the rotor, also automatically.

DESCRIPTION OF THE PREFERRED EMBODIMENT

Figure 2:
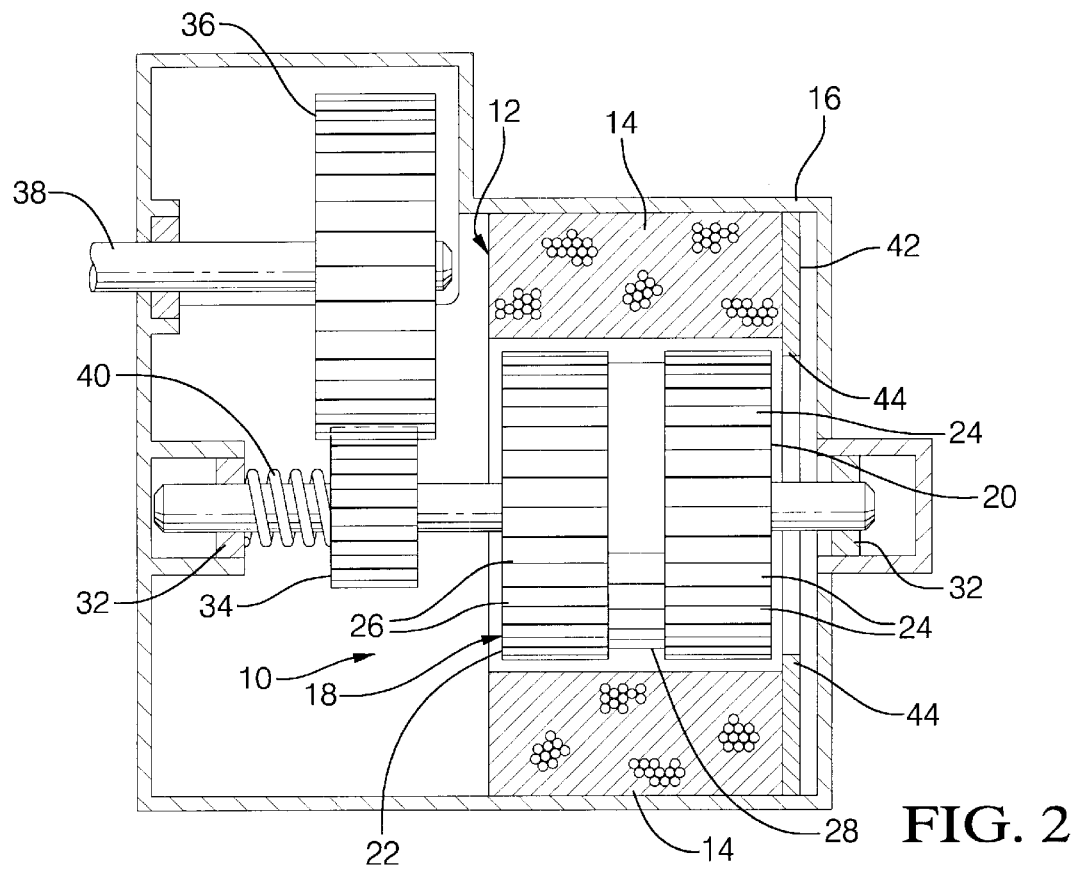
FIG. 2 is a view like FIG. 1, but showing the energized and un locked position.

Referring first to FIG. 2, a stepper motor indicated generally at 10 includes a stator, indicated generally at 12, which is comprised of a plurality of drive coils 14, each of which has a typical central iron core, not illustrated. The drive coils 14 are evenly spaced circumferentially or angularly about a generally cylindrical envelope. Stator 12 is fixed within a housing 16 that contains other components as well. Centered within stator 12 is a rotor, indicated generally at 18, which contains two toothed disks of magnetic material, typically iron, a first disk 20 and second disk 22. The terms "first" and "second" have no significance here other than locational, and the two are basically identical although, as indicated above, they may be offset a half step relative to each other in order to create a greater possible number of indexed positions of the rotor 18 within the stator 12. Here, first disk 20 has a particular role in the novel brake mechanism of the invention, specifically through its regularly spaced peripheral teeth 24. Second disk 22 has similar teeth 26, but they perform no function in the brake of the invention, although they could in another embodiment. Fixed between the disks 20 and 22 is a permanent magnet 28, which provides magnetic flux continually permeating disks 20 and 22. Disks 20, 22 and magnet 28 are all fixed to a central shaft 30, co axially maintained within stator 12. Shaft 30 is supported within housing 16 on plain bearings 32 that allow it to rotate, and also to slide back and forth along the central axis of shaft 30, for a purpose described below. Also fixed to shaft 30 is a first gear 34, which meshes with a second gear 36, to power a drive shaft 38 that exits housing 16. Drive shaft 38 would operate any desired mechanism, such as a film valve roller, and the size relationship of the two gears 34 and 36 would determine the torque multiplication created, if any. The components described so far, with the exception of the allowed axial sliding motion of shaft 30, are conventional to a stepper motor like 10, as is the basic motor operation. As the stator 12 is energized, as shown in FIG. 2, drive coils 14 are energized in a desired pattern, the rotor 18 is indexed from one pre determined angular position to another, as the rotor teeth 24 and 26 align with the cores in the coils 14. That pre determined angular position of the rotor teeth 24 and 26 remains when the coils 14 are de energized, a stable position naturally achieved because of the interaction of the magnetized rotor teeth 24 and 26 with the iron cores of the drive coils 14. In addition, when the stator 12 is energized, there is a centering force that acts to keep rotor 18 stable and axially centered, side to side, within stator 12 as rotor 18 turns. Normally, this axial centering force is invisible, since rotor 18 would be supported on bearings that kept it axially centered within stator 12 at all times, anyway. Both of these characteristic features of the operation of rotor 18, the axial centering force and the stable, pre determined angular aligned positions, are taken advantage by the brake mechanism of the invention, described next.

Figure 1:
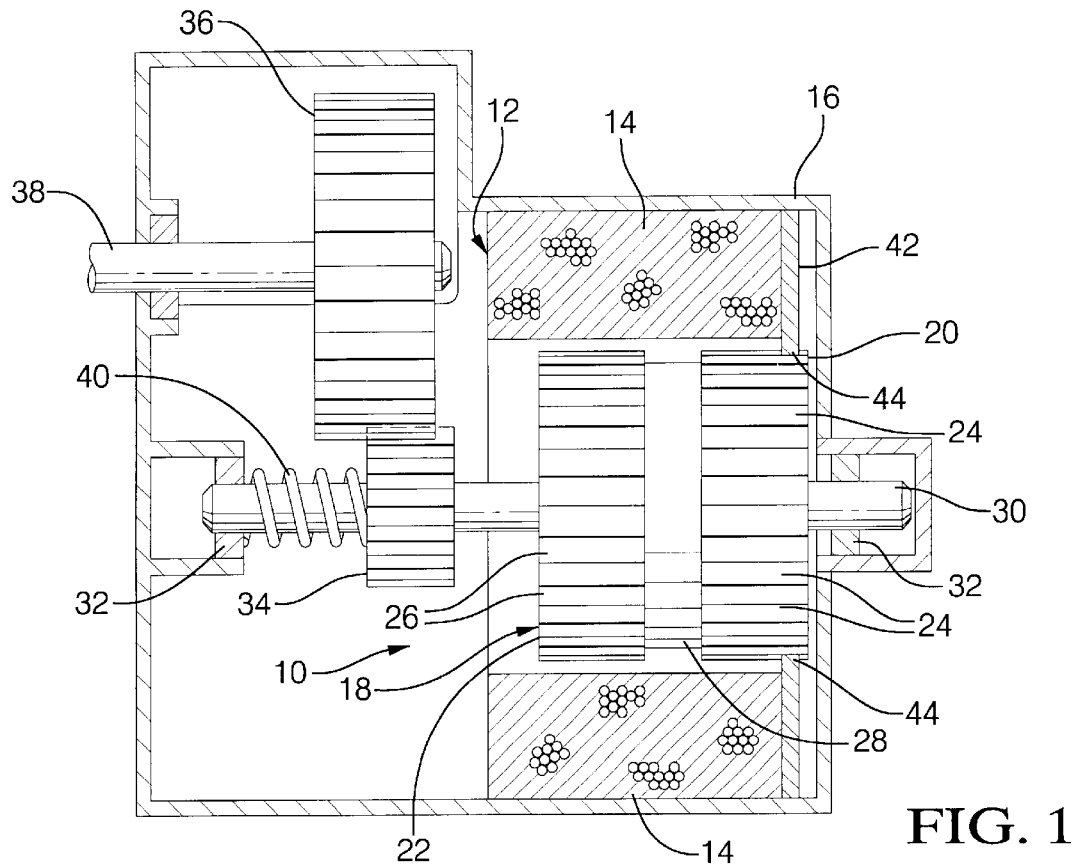
FIG. 1 is a cross sectional view of a housing containing a preferred embodiment of a stepper motor and brake assembly made according to the invention, shown in a de energized and locked position.

Referring next to FIG. 1, it will be recalled that the bearings 32 allow the central shaft 30 to slide axially back and forth, as well as rotate, which is not a conventional feature of a stepper motor. There would normally be no reason to allow the central shaft 30 to slide, nor to axially locate the rotor 18 anywhere other than centered within stator 12 at all times. Here, however, a resilient means in the form of a coil spring 40 continually presses between housing 16 (specifically against left bearing 32) and first gear 34 (or any other stop member fixed to central shaft 30) so as to force shaft 30 and rotor 18 continually axially in one direction, to the right as shown. However, the spring 40 is able to do so only when the stator 12 is de energized, as shown in FIG. 1, because when stator 12 is energized, (referring back to FIG. 2) the axial centering force noted above is strong enough to counteract spring 40 and pull rotor 18 back to the normal axially centered position within stator 12, compressing spring 40. This centering action is similar to the motion of a solenoid plunger within a solenoid coil. The purpose of the pre loaded, axial sliding of shaft 30 and rotor 18 is described next.

Figure 3:
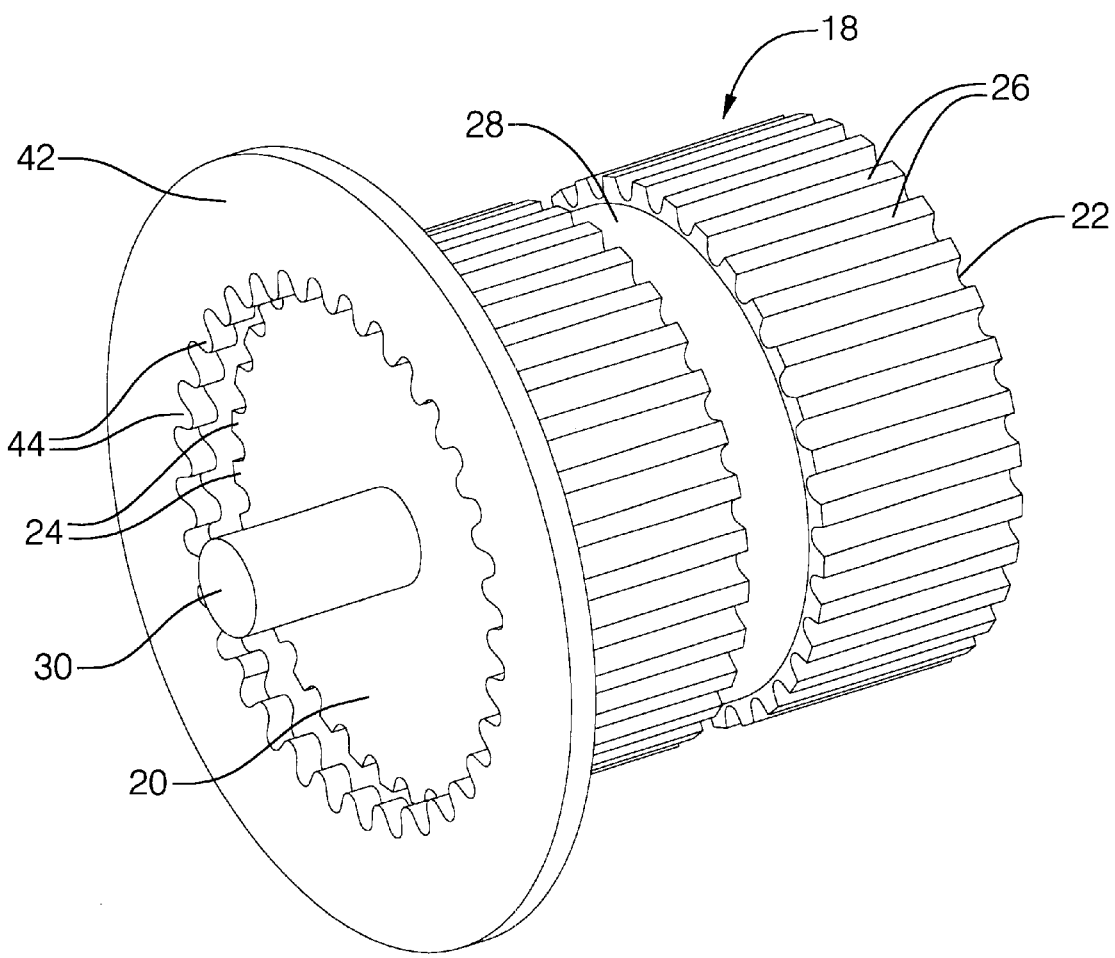
FIG. 3 is a perspective view of just the rotor and locking ring, in the disengaged un locked position.

Referring next to FIGS. 1 and 3, the other extra component added by the invention, in addition to the bearings 32 that allow the shaft 30 to slide axially and the spring 40 that causes it to slide axially, is a locking ring 42. Locking ring 42 is formed from a suitably rigid but non-magnetic material, nylon, for example. Locking ring 42 is fixed relative to stator 12 so as to be co-axial to central shaft 30 and, as best seen in FIG. 3, has a series of locking teeth 44 that match the teeth 24 on first rotor disk 20. Ring 42 is angularly aligned such that its locking teeth 44 are in a position that registers with the stable position that the first rotor disk teeth 24 characteristically achieve when the stator 12 is de energized. When that de energization occurs, the compressed spring 40 is now able, automatically, to expand and push the first rotor disk 20 to the right far enough to lockingly engage the rotor disk teeth 24 with the locking ring teeth 44, as shown in FIG. 1. The engagement of teeth 24 with teeth 44 is a positive, locking engagement in the sense that some component, such as the teeth, would actually have to be forced strongly enough to break in order for the rotor 18 to be released, as contrasted to a less positive braking force, such as a brake pad, in which only the frictional force acts. After engagement, rotor 18 is locked relative to stator 12 and housing 16, central shaft 30 is locked against turning, and so are the gears 34, 36 and the drive shaft 38. Any mechanism driven by shaft 38 will be effectively braked, and far more solidly than a simple friction pad type of brake. For example, if the mechanism driven by the drive shaft 38 is a winding roller of a film valve, the film valve will be held firmly in position, and will not be back driven by its tensioning spring.

Referring again to FIG. 1, when the stator 12 is re energized, the rotor 18 is pulled back leftward to center, as shown, recompressing spring 40. The rotor disk teeth 24 are pulled axially out of engagement with the locking ring teeth 44. The rotor 18 is then able to index and turn conventionally. Both the locking and unlocking occur automatically and fairly quickly, because of the cooperation of the axial sliding or rotor 18 allowed by the bearings 32, the uni directional axial bias provided by the coil spring 40, and the oppositely acting centering action of the rotor 18 within the energized stator 12. The positively locking brake is provided very cost effectively, only at the cost of the bearings 32, the spring 40 and the locking ring 42, none of which are expensive components.

Variations in the embodiment disclosed could be made. The axial sliding of shaft 30 and rotor 18 could be provided by a two part shaft in which one section telescoped within the other, rather than by sliding bearings 32. A resilient means other than a coil spring 40 could provide the constant, unidirectional axial bias on rotor 18, and in either axial direction, acting either in tension or compression. For example, a telescoping shaft 30 could have its own internal biasing spring. If the direction of axial bias were reversed, then a locking ring like 42 could be made to engage with the teeth 26 on the other side of rotor 18, instead. The teeth on either rotor disk 20 or 22 make a convenient locking surface to engage a locking member like the teeth on ring 42, since they are there anyway. However, another type of locking member could be provided, fixed relative to stator 12, so long as it was able to register with and automatically lockingly engage with some part of the rotor 18 as it axially shifted at the time of stator de energization. A stepper motor like 10 could, conceivably, be made to turn a mechanism directly, with no intervening reduction gear set like 34 and 36. In that case, the spring 40 or other resilient means could press against some purposefully provided solid stop on shaft 30, rather than the conveniently located first reduction gear 34.

What is claimed is:

1. An automatically acting braking system for a stepper motor (10) of the type having a rotor (18) that is located within a stationary stator (12) and which rotates about the central axis of a central shaft (30) when the stator is energized, and which is forcibly held in an axially centered position within the stator (12) when the stator (12) is energized, and which takes on a substantially stable, pre determined angular alignment relative the stator (12) when the stator (12) is energized, said braking system characterized by, a sliding means (32) allowing toothed rotor (18) to move axially back and forth along the central axis of central shaft (30) while remaining radially centered within stator (12), a resilient means (40) sufficiently strong to bias the rotor (18) in one axial direction along the central axis of central shaft (3) and away from its axially centered position when the stator (12) is not energized, but sufficiently weak to be overcome by the axial centering force acting on the toothed rotor (18) when the stator (12) is energized, and a locking member (42) fixed relative to the stator (12) in a position that allows it to register with and automatically lockingly engage with the rotor (18) when the stator (12) is de energized and the rotor (18) is pushed in one axial direction by the resilient means (40).

2. An automatically acting braking system for a stepper motor (10) according to claim 1, further characterized in that:

the sliding means (32) is a plain bearing that allows central shaft (30) to slide back and forth along its central axis.

3. An automatically acting braking system for a stepper motor (10) according to claim 1, further characterized in that:

the locking member (42) is a ring that has teeth (44) located so as to register with and engage complementary teeth (24) on rotor (18) when the stator (12) is de energized.

4. An automatically acting braking system for a stepper motor (10) according to claim 1, further characterized in that:

the resilient means (40) is a coil spring that acts in tension to continually bias the rotor (18) and the shaft (30) in one axial direction.

* * * * *